US012561886B2

(12) United States Patent  
Gommans et al.

(10) Patent No.: US 12,561,886 B2  
(45) Date of Patent: Feb. 24, 2026

(54) RENDERING A VISUAL REPRESENTATION OF A LUMINAIRE BY USING DISPLACEMENT AND BUMP MAPS

(71) Applicant: SIGNIFY HOLDING B.V., Eindhoven (NL)

(72) Inventors: Hendrikus Hubertus Petrus Gommans, Meeuwen (NL); Wei Pien Lee, Eindhoven (NL); Mohamed Yehia Mohamed Elsayed, Eindhoven (NL); Sander Meessen, Eindhoven (NL); Chris Damkat, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 132 days.

(21) Appl. No.: 18/572,298

(22) PCT Filed: Jun. 20, 2022

(86) PCT No.: PCT/EP2022/066728  
§ 371 (c)(1),  
(2) Date: Dec. 20, 2023

(87) PCT Pub. No.: WO2022/268718  
PCT Pub. Date: Dec. 29, 2022

(65) Prior Publication Data  
US 2024/0203029 A1    Jun. 20, 2024

(30) Foreign Application Priority Data  
Jun. 25, 2021    (EP) .................................... 21181622

(51) Int. Cl.  
*G06T 15/04*        (2011.01)  
*B33Y 50/00*        (2015.01)  
(Continued)

(52) U.S. Cl.  
CPC .............. *G06T 15/04* (2013.01); *B33Y 50/00* (2014.12); *B33Y 80/00* (2014.12); (Continued)

(58) Field of Classification Search  
None  
See application file for complete search history.

(56) References Cited

U.S. PATENT DOCUMENTS

2004/0181382 A1*    9/2004  Hu .......................... G06T 13/60  
                                                    703/9  
2014/0301179 A1*   10/2014  Rich ........................ G06T 9/00  
                                                    29/592

(Continued)

FOREIGN PATENT DOCUMENTS

WO        2018025009 A1     2/2018

OTHER PUBLICATIONS

Kuipers, Tim, et al., "Hatching for 3D Prints: Line-Based Halftoning for Dual Extrusion Fused Deposition Modeling," Computers & Grapphics, Journal Homepage: www.elsevier.com/locate/cag, May 2018 (12 Pages).

(Continued)

*Primary Examiner* — Jason A Pringle-Parker

(57)                ABSTRACT

A method of displaying a visual representation of a luminaire to be manufactured using an additive manufacturing process comprises obtaining (101) a three-dimensional model of the luminaire and obtaining (103) a displacement map associated with the three-dimensional model for accurately representing details of the luminaire. The method further comprises representing (105) print tracks created by the additive manufacturing process in a bump map for reducing rendering complexity, rendering (107) the visual representation of the luminaire based on the three-dimen- (Continued)

sional model, the displacement map, and the bump map, and displaying (109) the visual representation.

12 Claims, 4 Drawing Sheets

(51) Int. Cl.

| | |
|---|---|
| *B33Y 80/00* | (2015.01) |
| *G05B 19/4099* | (2006.01) |
| *G06T 15/20* | (2011.01) |
| *G06T 15/50* | (2011.01) |

(52) U.S. Cl.
CPC .......... *G05B 19/4099* (2013.01); *G06T 15/20* (2013.01); *G06T 15/50* (2013.01); *G05B 2219/49023* (2013.01)

(56) References Cited

U.S. PATENT DOCUMENTS

| | | | | |
|---|---|---|---|---|
| 2015/0269289 A1* | 9/2015 | Kim | | G06T 17/00 |
| | | | | 703/6 |
| 2015/0339852 A1 | 11/2015 | Plowman et al. | | |
| 2017/0116778 A1* | 4/2017 | Lee | | G06T 7/536 |
| 2017/0274596 A1* | 9/2017 | Kardos | | B33Y 50/00 |
| 2018/0240263 A1* | 8/2018 | Courter | | B33Y 50/02 |
| 2018/0319087 A1* | 11/2018 | Eom | | B29C 64/106 |
| 2019/0029369 A1* | 1/2019 | VanWagnen | | B33Y 80/00 |

OTHER PUBLICATIONS

Anonymous, "Texturing—How to Make a Mesh Look Like It Was 3D Printed," Blender Stack Exchange, Mar. 2017, Retrieved From the Internet: URL:https://blender.stackexchange.com/questions/6210/how-to-make-a-mesh-look-like-it-was-3d-printed, Retrived on Nov. 18, 2021 (7 Pages).

Warburton, Alan, "3D Print Simulator," Jan. 2017, Retrieved From the Internet: URL: https://web.archive.org/web/20170120015204/https://alanwarburton.co.uk/3d-print-simulator/, Retrieved on Nov. 18, 2021 (1 Page).

Anonymous, "Cycles Render Engine, "Using a Normal Map Together With a Bump Map," Blender Stack Exchange, Sep. 2018, Retrieved From the Internet: URL: https://blender.stackexchange.com/questions/16443/using-a-normal-map-together-with-a-bump-map," Retrieved on Nov. 18, 2021(3 Pages).

The CG Essentials, "Bibliographic Information for 'Using Normal Maps and Displacement Maps in Blender! PBR Material Tutorial'", Jul. 2020, Retrieved From the Internet: URL: https://www.youtube.com/watch?v=oxirrgp4gu (2 Pages).

"High-Frequency Details: Bump or Displacement Mapping?" Advanced Search/Forum Search, Jul. 2005, Retrieved From the Internet: URL: https:/www.sidefx.com/forum/topics 27458, Retrieved on Dec. 14, 2023 (6 Pages).

* cited by examiner

RENDERING A VISUAL REPRESENTATION OF A LUMINAIRE BY USING DISPLACEMENT AND BUMP MAPS

CROSS-REFERENCE TO PRIOR APPLICATIONS

This application is the U.S. National Phase application under 35 U.S.C. § 371 of International Application No. PCT/EP2022/066728, filed on Jun. 20, 2022, which claims the benefit of European Patent application Ser. No. 21/181, 622.8, filed on Jun. 25, 2021. These applications are hereby incorporated by reference herein.

FIELD OF THE INVENTION

The invention relates to a system for displaying a visual representation of a luminaire to be manufactured using an additive manufacturing process.

The invention further relates to a method of displaying a visual representation of a luminaire to be manufactured using an additive manufacturing process.

The invention also relates to a computer program product enabling a computer system to perform such a method.

BACKGROUND OF THE INVENTION

In the past years, customization of products seems to be a trend and simultaneously, 3D printing is becoming a widely spread technology to produce products. Signify has combined both trends and now does not only use Fused Filament Fabrication (FFF) 3D printing technologies for mass production, but also allows customized luminaire designs to be printed.

Someone that uploads a printable design would preferably like to see what the printed luminaire is going to look like and even more preferably be able to adapt the camera location and orientation. Photorealistic rendering of printable designs preferably includes the details inherent in the printing process, the fine-layered structure. This generally leads to runtime intensive calculations that severely constrains the iterative design process during a customer journey.

Today, not all hardware, especially e.g., a mobile device with limited performance, is suited for real-time rendering of this amount of detail, which degrades the design and/or customization experience. For example, the user interface may become less responsive and even unresponsive. An extra dimension is added to the complexity when the print process is part of the configuration and allows for choices of appearances such as e.g., the print layer height and/or width.

SUMMARY OF THE INVENTION

It is a first object of the invention to provide a system, which can display a visual representation of a luminaire to be manufactured using an additive manufacturing process when processing resources are limited.

It is a second object of the invention to provide a method, which can be used to display a visual representation of a luminaire to be manufactured using an additive manufacturing process when processing resources are limited.

In a first aspect of the invention, a system for displaying a visual representation of a luminaire to be manufactured using an additive manufacturing process comprises at least one output interface and at least one processor configured to obtain a three-dimensional model of said luminaire, obtain a displacement map associated with said three-dimensional model for accurately representing details of said luminaire, represent print tracks created by said additive manufacturing process in a bump map for reducing rendering complexity, render said visual representation of said luminaire based on said three-dimensional model, said displacement map, and said bump map, and display said visual representation via said at least one output interface.

The additive manufacturing process may comprise 3D printing, for example. To render the visual representation of the luminaire with limited processing resources, a combination of bump and displacement maps is used. Conventional bump maps or Dot3 bump maps (also referred to as normal maps) may be used, for example. Both bump and displacement mapping are well known techniques in the field of computer graphics. A noticeable difference between the two methods is that the former does not alter the shape of the underlying object while the latter does. Bump mapping only changes the local orientation of the surface normal and thereby it affects how light incident on the surface affects the surface, whereas displacement mapping displaces and thereby distorts the surface.

The details created by displacement mapping are limited by the detail of the three-dimensional model, typically a mesh model, because its vertices are literally displaced (moved). High detail displacement requires more vertices, which in turn requires more data to be processed, so it is desirable to keep the mesh model (data) limited. Bump mapping created detail is not limited to the distribution and density of vertices. However, it only changes the pixel color from the render camera point of view and therefore, it will not change the silhouette (contour) of the model.

When a luminaire is manufactured using an additive manufacturing process, e.g., manufactured by means of extrusion printing, the print tracks create a visible (rippled) texture that needs to be visualized for a photorealistic of the design. These print tracks typically vary in layer height between 0.1 and 2 mm and are horizontally oriented during manufacturing, which generally corresponds to the orientation of the luminaire in the rendering scene. These two properties, i.e., layer height and directionality, makes that a bump map can be used to provide a photorealistic rendering of the luminaire to be manufactured. Therefore, the average dimension of the triangles in the surface tessellation that make up for the part's geometry (mesh model) is not required to be sub millimeter sized. As a result, the number of triangles can be kept very low, which in turn optimizes memory and CPU usage in the rendering process. Thus, in addition to reducing rendering complexity, representing print tracks created by the additive manufacturing process in a bump map may also reduce model size.

Preferably, said displacement map is associated with a first surface area of said three-dimensional model and said bump map is associated with a second surface area of said three-dimensional model, said first and second surface areas being at least partially overlapping. Said first and second surface areas may be identical, for example.

Said at least one processor may be configured to determine user-specified parameters for said additive manufacturing process and render said visual representation of said luminaire further based on said user-specified parameters. For example, user-specified parameters may indicate the print layer height and/or track width and/or from which material the luminaire will be manufactured.

Said at least one processor may be configured to determine at least one layer height and at least one track width and represent said print tracks created by said additive manufacturing process in said bump map based on said at least one layer height and said at least one track width. The layer height and the track width have a significant impact on what the layers will look like in the printed luminaire and are therefore normally used as input for determining the print track data. This data could be used directly for generating data required for visualization and therefore for avoiding expensive calculations e.g., for actual slicing and/or for generating a print track mesh model. By avoiding CPU intensive calculations, the visual representation can be re-rendered quickly after the user has made changes, thereby improving the responsiveness of the user interface. The layer height and the track width may be roughly approximated, realistically approximated, or something in between.

Said at least one processor may be configured to deter-mine a camera location and orientation based on user input and render said visual representation of said luminaire further based on said camera location and orientation. Said at least one processor may be configured to determine a further camera location and orientation based on further user input, render a further visual representation of said luminaire based on said three-dimensional model, said displacement map, said bump map, and said further camera location and orientation, and display said further visual representation via said at least one output interface. This allows the user to interact with the displayed visual representation, e.g., to see what the luminaire to be printed is going to look like from different locations and orientations and optionally see the impact of changes in user-specified parameters.

It may be possible to switch to a different mode in which a displacement map fully covers the printed surface texture, e.g., when more processing resources are available and/or physical accurateness is preferred over responsiveness. A user may not only be able to upload a printable design of a luminaire but may even be able to upload an image that can be mapped to the three-dimensional model such that the logo will be visible on the manufactured luminaire. The photo-realistic rendering of the printable designs then includes both the details of an image texture and the details inherent in the printing process, i.e., the fine-layered structure. Said visual representation may further include a representation of a light effect generated by an activated light source in said luminaire.

Said three-dimensional model may be a three-dimensional mesh model or a boundary representation, for example. Said at least one processor may be configured to receive said three-dimensional model. Alternatively or additionally, said at least one processor may be configured to receive a digital three-dimensional design model of said luminaire, said digital three-dimensional design model comprising texture details of said luminaire, and obtain said three-dimensional model and said displacement map by creating said three-dimensional model and said displacement map based on said three-dimensional design model, said displacement map being created based on said texture details of said luminaire.

Said at least one processor may be configured to perform frequency splitting on texture details associated with said luminaire, select a first portion of said texture details and a second portion of said texture details based on said frequency splitting, include said first portion only in said displacement map, and include said second portion only in said bump map.

Thus, frequency splitting may be used to split the relief detail of the luminaire design into bump and displacement maps. The same image frequency splitting may also be performed on the print relief textures and the modulation patterns, both created by the additive manufacturing process. In this case, a bump map may be used for high frequency detail and a displacement map may be used for lower frequency modulation patterns. If two sets of displacement and bump maps are created (i.e., one set for the relief detail of the luminaire design and one set for the print relief textures and modulation patterns), the two sets may be merged into a single set of bump and displacement maps, e.g., a single bump map covering the entire surface and a single displacement covering the entire surface.

The split may be based on 2D or 3D frequency analysis for example. 2D analysis may be preferred if detail is considered as some kind projection on the 3D (base) model. 3D analysis is a more generic approach. In this case, one might obtain more freedom on how "detail projection" is applied to the 3D (base) model. For example, in some situations, detail may be projected only in the xy-plane (horizonal) as opposed to in the direction of the 3D (base) model surface 3D normal.

Said at least one processor may be configured to select said first portion by selecting frequency components having a frequency not exceeding a threshold and select said second portion by selecting frequency components having a frequency exceeding said threshold. For example, in Fourier space, (high) frequencies that correspond to $10^3$ m$^{-1}$ may be covered using a bump map, while (low) frequencies that are below this $10^3$ m$^{-1}$ may be modelled using a displacement map. Said at least one processor may be configured to determine said threshold based on one or more parameters of said additive manufacturing process, e.g., layer height. Instead of the above-described linear filtering approach, non-linear approaches such as bilateral filter or another heuristic filter algorithms may be used.

Said at least one processor may be configured to select a first portion of texture details associated with said luminaire and a second portion of said texture details based on an orientation of said print tracks and orientations of said texture details, include said first portion only in said displacement map, and include said second portion only in said bump map. For example, texture details with a medium frequency may be selected as part of either the first portion or the second portion in dependence on whether they have the same orientation as the print tracks or not. If they have the same orientation as the print tracks, they may be selected as part of the second portion, which is included in the bump map, in order to reduce rendering complexity and model size. In a second aspect of the invention, a method of displaying a visual representation of a luminaire to be manufactured using an additive manufacturing process comprises obtaining a three-dimensional model of said luminaire, obtaining a displacement map associated with said three-dimensional model for accurately representing details of said luminaire, representing print tracks created by said additive manufacturing process in a bump map for reducing rendering complexity, rendering said visual representation of said luminaire based on said three-dimensional model, said displacement map, and said bump map, and displaying said visual representation. Said method may be performed by software running on a programmable device. This software may be provided as a computer program product.

Moreover, a computer program for carrying out the methods described herein, as well as a non-transitory computer readable storage-medium storing the computer program are provided. A computer program may, for example, be down-loaded by or uploaded to an existing device or be stored upon manufacturing of these systems.

A non-transitory computer-readable storage medium stores at least one software code portion, the software code portion, when executed or processed by a computer, being configured to perform executable operations for displaying a visual representation of a luminaire to be manufactured using an additive manufacturing process.

The executable operations comprise obtaining a three-dimensional model of said luminaire, obtaining a displacement map associated with said three-dimensional model for accurately representing details of said luminaire, representing print tracks created by said additive manufacturing process in a bump map for reducing rendering complexity, rendering said visual representation of said luminaire based on said three-dimensional model, said displacement map, and said bump map, and displaying said visual representation.

As will be appreciated by one skilled in the art, aspects of the present invention may be embodied as a device, a method or a computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit", "module" or "system." Functions described in this disclosure may be implemented as an algorithm executed by a processor/microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples of a computer readable storage medium may include, but are not limited to, the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of the present invention, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing.

Computer program code for carrying out operations for aspects of the present invention may be written in any combination of one or more programming languages, including an object oriented programming language such as Java™, Smalltalk, C++ or the like, functional programming languages like F #, multi-paradigm programming languages like JavaScript and TypeScript, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or a central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of devices, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

BRIEF DESCRIPTION OF THE DRAWINGS

These and other aspects of the invention are apparent from and will be further elucidated, by way of example, with reference to the drawings, in which.

Corresponding elements in the drawings are denoted by the same reference numeral.

DETAILED DESCRIPTION OF THE EMBODIMENTS

Figure 1:
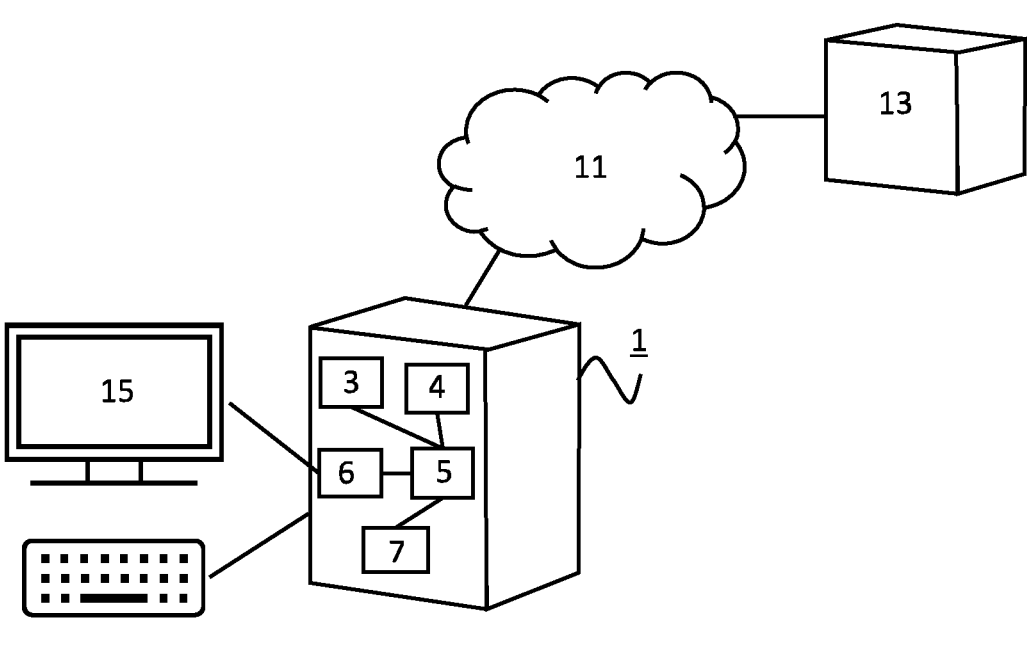
FIG. 1 is a block diagram of an embodiment of the system.

FIG. 1 shows a first embodiment of the system for displaying a visual representation of a luminaire to be manufactured using an additive manufacturing process. In this first embodiment, the system is a computer 1. The computer 1 is connected to the Internet 11. A display device 15 is connected to the computer 1. The computer 1 may be a desktop computer or laptop computer, for example. Alternatively, the system may be a tablet or mobile phone, for example.

The computer 1 comprises a receiver 3, a transmitter 4, a processor 5, a display interface 6, and storage means 7. The processor 5 is configured to obtain a three-dimensional model of the luminaire, obtain a displacement map associated with the three-dimensional model for accurately representing details of the luminaire, represent print tracks created by the additive manufacturing process in a bump map for reducing rendering complexity, render the visual representation of the luminaire based on the three-dimensional model, the displacement map, and the bump map, and display the visual representation on the display device 15 via the display interface 6.

The three-dimensional model may be obtained from an Internet server 13, for example. The Internet server 13 is also connected to the Internet 11. In the embodiment of FIG. 1, the rendering is executed by the processor 5, e.g., a CPU. In an alternative embodiment, the rendering is at least part executed by a GPU. In the embodiment of FIG. 1, the computer 1 is a local computer located near the display device 15. In an alternative embodiment, the computer 1 is a cloud computer which displays the visual representation via a local device, e.g., via a local computer, which is connected to the display device or comprises a display itself.

In the embodiment of the computer 1 shown in FIG. 1, the computer 1 comprises one processor 5. In an alternative embodiment, the computer 1 comprises multiple processors. The processor 5 of the computer 1 may be a general-purpose processor, e.g., from Intel or AMD, or an application-specific processor. The processor 5 of the computer 1 may run a Windows or Unix-based operating system for example. The storage means 7 may comprise one or more memory units. The storage means 7 may comprise one or more hard disks and/or solid-state memory, for example. The storage means 7 may be used to store an operating system, applications and application data, for example.

The receiver 3 and the transmitter 4 may use one or more wired and/or wireless communication technologies such as Ethernet and/or Wi-Fi (IEEE 802.11) to connect to the Internet 11, for example. In an alternative embodiment, multiple receivers and/or multiple transmitters are used instead of a single receiver and a single transmitter. In the embodiment shown in FIG. 1, a separate receiver and a separate transmitter are used. In an alternative embodiment, the receiver 3 and the transmitter 4 are combined into a transceiver. The computer 1 may comprise other components typical for a computer such as a power connector. The invention may be implemented using a computer program running on one or more processors.

Figure 2:
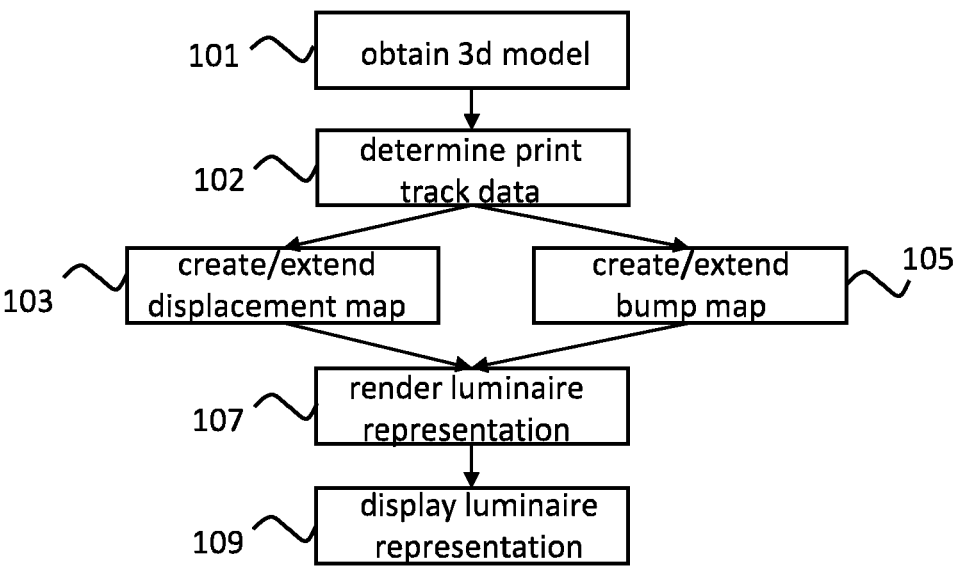
FIG. 2 is a flow diagram of a first embodiment of the method.

A first embodiment of the method of displaying a visual representation of a luminaire to be manufactured using an additive manufacturing process is shown in FIG. 2. The method may be performed by the computer 1 of FIG. 1, for example. A step 101 comprises obtaining a three-dimensional model of the luminaire. The three-dimensional model may be a three-dimensional mesh model or a boundary representation, for example.

A step 102 comprises determining print track data, e.g., print relief textures and modulation patterns, based on the three-dimensional obtained in step 101. The print track data may represent a rough approximation or a realistic approximation of what the layers will look like in the luminaire after it has been manufactured. The toolpath generator algorithm or some of its code may be re-used to determine the print track data if a realistic approximation is desired, for example.

The layer height and the track width have a significant impact on what the layers will look like in the printed luminaire and are therefore normally used as input for determining the print track data. This data could be used directly for generating data required for visualization and therefore for avoiding expensive calculations e.g., for actual slicing and/or for generating a print track mesh model. By avoiding CPU intensive calculations, the visual representation can be re-rendered quickly after the user has made changes, thereby improving the responsiveness of the user interface.

The layer height and the number of stacked layers determine the height of the printed model. The track width and the number of parallel layers/tracks determine the width of the printed model. The lengths of the tracks/layers determine the length of the model. A luminaire may be printed with a different orientation than in which it needs to be mounted/placed. For example, the height of the printed model may in fact correspond to the width of the luminaire.

The layer height and the track width may be roughly approximated, realistically approximated, or something in between, e.g., by using one of the following approaches for the layer height and/or one of the following approaches for the track width:

a. Global layer height/track width: a single layer height/ track width per model;

b. Layer height/track width per layer;

c. Sampled layer height/track width over the toolpath;

d. Geometry/location dependent formula and/or algorithm, e.g., location on z-axis (bottom-to-top-axis);

e. Use of slicing algorithm settings.

a) The global track width is a setting that indicates a target for an algorithm to slice the desired model in such a manner that all tracks will have the same track width. Since the model typically does not have the same width everywhere and an integer multiple of the track width may not match the width of the model on a certain layer, a track width per layer may be used instead of a global track width or the last track width may be changed to match the width of the model on that layer, for example. Similarly, the global layer height is a setting that indicates a target for an algorithm to slice the desired model in such a manner that all tracks will have the same layer height.

b) In a more advanced slicing algorithm, the track width depends on the slope of the model. A main reason is to ensure enough overlap of the vertically stacked layers/ print tracks to prevent the print from collapsing due to gravity while it is still warm enough to do so. To approximate this slicing algorithm, different tracks widths may be used for different layers. Similarly, different layer heights may be used for different layers.

c) For each print track, it is possible to modulate the print track width while maintaining the original print trajectory. This will result in many width values along the track. To approximate this modulation, the track width may be sampled over the toolpath. This sampling may be equidistant (regular), irregular, or something in between. The same applies to the layer height. It may be possible to modulate the layer height non-uniformly even with print tracks "stacked" horizontally next to each other within the same "layer". However, although possible, it is not preferred to modulate in a volumetric manner, i.e., to have multiple tracks/layers stacked both horizontally and vertically but not stacked in a uniform manner.

d) The track width and layer height may even be modulated completely free in the whole 3D space of the model to be manufactured. As a variation on c), a geometry/location dependent formula and/or algorithm may be used to approximate the modulated track width and layer height.

e) If the slicing algorithm settings can be accessed, these can be used to determine complex height and/or track width data. Slicing normally involves a more mathematical or algorithmic "sampling" of the model.

A step 103 comprises obtaining a displacement map associated with the three-dimensional model for accurately representing details of the luminaire. The above-mentioned modulation patterns and/or texture details associated with the luminaire may be represented in the displacement map, for example.

A step 105 comprises representing print tracks created by the additive manufacturing process in a bump map for reducing rendering complexity. The print tracks create a visible (rippled) texture that needs to be visualized. This visible texture is represented in the bump map because it is high frequency detail, which would require sub millimeter size triangles in the surface tessellation of the mesh model when represented in the displacement map.

Preferably, the displacement map is associated with a first surface area of the three-dimensional model and the bump map is associated with a second surface area of the three-dimensional model which at least partially overlaps with the first surface area and may even be identical to the first surface area.

The displacement and bump maps may be created or extended by re-using the toolpath generator algorithm and using the print track data determined in step 102, for example. If the toolpath generator algorithm is not re-used, accurate info about how the actual algorithm "ramps up and down" at the end of the model or whether the first few layers have different values as well may not be available. This results in a visualization that approximates the manufactured luminaire less accurately. The approximation is especially rough when a global layer height and a global track width are used. However, in this case, it may be possible to use the same bump and/or displacement maps for different portions of the model.

The displacement maps and bump maps may alternatively be created or extended on other ways. As a first example, stored displacement maps and/or bump maps may be retrieved based on the print track data determined in step 102 and then combined, e.g., through interpolation. As a second example, machine learning may be used to determine displacement maps and/or bump maps (i.e., the outputs) based on the print track data determined in step 102 (i.e., the inputs). The training data typically includes print track data for a plurality of models and manually created displacement maps and/or bump maps for these same models.

A step 107 comprises rendering the visual representation of the luminaire based on the three-dimensional model, the displacement map, and the bump map. The visual representation optionally includes a representation of a light effect generated by an activated light source in the luminaire. Some material also changes in appearance due to changes of other process values such as print speed, extrusion temperature, or a combination. Examples of such appearance changes are changes in color, glossiness, or even foaminess. These appearance changes may also be considered when rendering the visual representation of the luminaire in step 107 and may be reflected in the visual representation. A step 109 comprises displaying the visual representation.

Figures 3, 4:
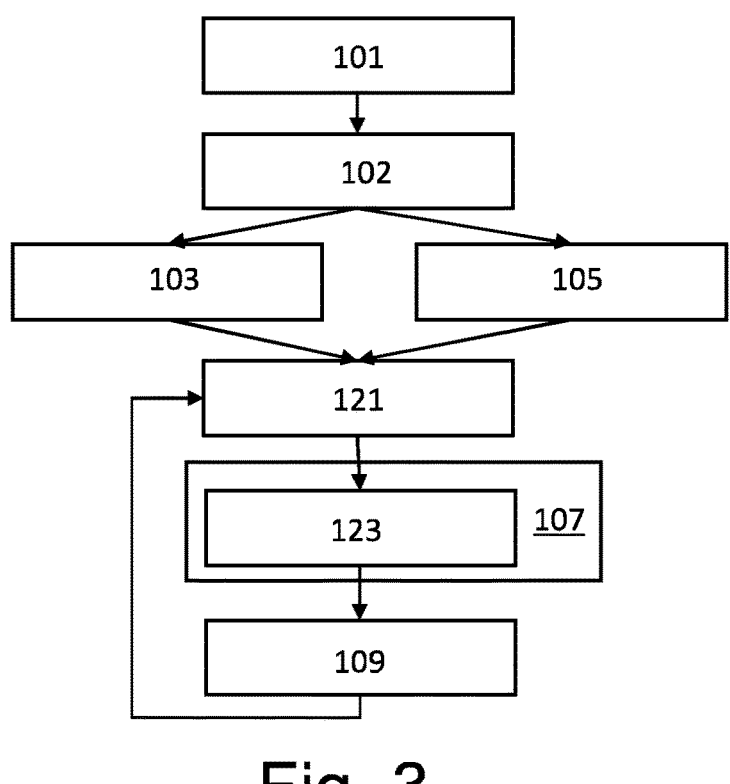
FIG. 3 is a flow diagram of a second embodiment of the method.
FIG. 4 is a flow diagram of a third embodiment of the method.

A second embodiment of the method of displaying a visual representation of a luminaire to be manufactured using an additive manufacturing process is shown in FIG. 3. In this second embodiment, additional steps have been included in the method of FIG. 2 to show the interaction with the user. The method may be performed by the computer 1 of FIG. 1, for example.

Instead of step 107, a step 121 is performed after steps 103 and 105 have been performed. Step 107 is performed after step 121. In the embodiment of FIG. 3, step 107 is implemented by a step 123. Step 121 comprises determining a camera location and orientation based on user input. Step 123 comprises rendering the visual representation of the luminaire based on the three-dimensional model, the displacement map, and the bump map and further based on the camera location and orientation determined in step 121.

After the visual representation has been displayed in step 109, step 121 may be repeated, after which the method proceeds as shown in FIG. 3. In the subsequent performance of steps 121, 123, and 109, a further camera location and orientation is determined based on further user input, a further visual representation of the luminaire is rendered based on the three-dimensional model, the displacement map, the bump map, and the further camera location and orientation, and the further visual representation is displayed. Steps 121, 123, and 109 may be repeated many times.

A third embodiment of the method of displaying a visual representation of a luminaire to be manufactured using an additive manufacturing process is shown in FIG. 4. The embodiment of FIG. 4 is an extension of the embodiment of FIG. 2. In the embodiment of FIG. 4, frequency splitting is performed on texture details associated with the luminaire, a first portion of the texture details and a second portion of the texture details are selected based on the frequency splitting, the first portion is included only in the displacement map, and the second portion is included only in the bump map.

In the embodiment of FIG. 4, steps 141, 143, and 145 are performed at least partly in parallel with step 102 and steps 103 and 105 are implemented by steps 147 and 149, respectively. In an alternative embodiment, steps 141-145 are performed before or after step 102. Step 141 comprises obtaining texture (i.e., relief) details associated with the luminaire. The texture details may be obtained, for example, from a digital three-dimensional design model, e.g., a fully detailed 3D model of the product, or from a displacement map associated with the three-dimensional (base) model obtained in step 101, for example. In the former case, a displacement map may be created based on the (texture details in the) digital three-dimensional design model.

Steps 143 and 145 comprise performing frequency splitting. Step 143 comprises selecting first frequency components from the texture details obtained in step 141. Step 145 comprises selecting second frequency components from the texture details obtained in step 141. The second frequency components selected in step 145 have a higher frequency than the first frequency components selected in step 143.

For example, steps 143 and 145 may comprise selecting frequency components having a frequency not exceeding a threshold as the first frequency components and selecting frequency components having a frequency exceeding the threshold as the second frequency components. The threshold may be determined based on one or more parameters of the additive manufacturing process.

Steps 143 and 145 may comprise performing frequency splitting using a DCT or wavelet transform on a displacement map, e.g. as described in US 2015/339852 A1. In the embodiment of FIG. 4, steps 143 and 145 are performed at least partly in parallel. In an alternative embodiment, step 143 is performed before step 145, step 145 is performed before step 143, or steps 143 and 145 are combined into a single step.

Steps 147 and 149 are performed after steps 102 and 145 have been performed. Step 147 comprises obtaining, e.g., creating, a displacement map for the three-dimensional model. The first frequency components selected in step 143 are represented in the displacement map and only in the displacement map. Modulation patterns may also be represented in the displacement map. In this case, step 147 may comprise combining two displacement maps, one representing luminaire relief details and one representing modulation patterns, into a single displacement map.

Step 149 comprises representing the print tracks created by the additive manufacturing process in a bump map. For example, a new bump map may be created in step 149. The second frequency components selected in step 145 are also represented in the bump map and only in the bump map. Step 149 may comprise combining two bump maps, one representing luminaire relief details and one representing the print tracks, into a single bump map.

Figure 5:
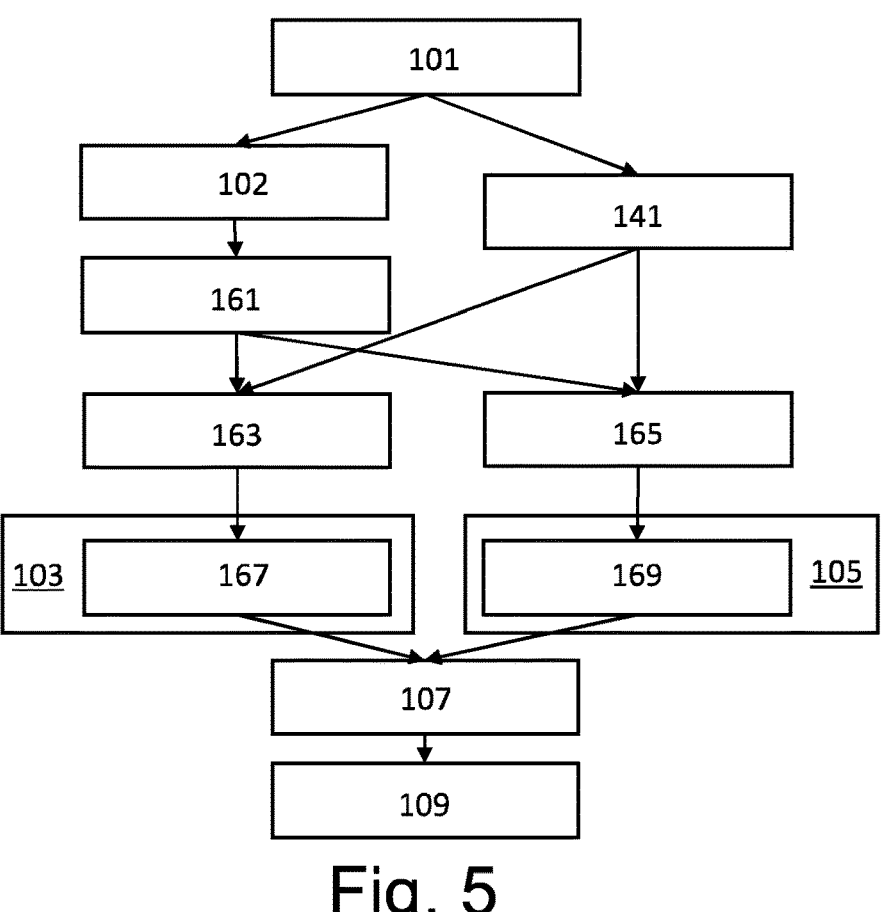
FIG. 5 is a flow diagram of a fourth embodiment of the method.

A fourth embodiment of the method of displaying a visual representation of a luminaire to be manufactured using an additive manufacturing process is shown in FIG. 5. This is an alternative to the embodiment of FIG. 4. In the embodiment of FIG. 5, a (high data) print track model is created based on the print track data determined in step 102 and a displacement map and a bump map are extracted from this print track model.

In the embodiment of FIG. 5, a step 161 is performed after step 102. Step 161 comprises creating a print track model based on the three-dimensional model obtained in step 101 and the print track details determined in step 102. Steps 102 and 161 are performed at least partly in parallel with step 141 of FIG. 4. In an alternative embodiment, steps 102 and 161 are performed before or after step 141.

A step 163 and a step 165 are performed after step 161. Steps 163 and 165 are somewhat similar to steps 143 and 145 of FIG. 4. However, in steps 163 and 165, the frequency splitting is performed both for the texture details obtained in step 141 and the print track model created in step 161. Step 163 comprises selecting first frequency components from the print track model and the luminaire texture details. Step 165 comprises selecting second frequency components from the print track model and the luminaire texture details.

Steps 103 and 105 are implemented by steps 167 and 169, respectively. Steps 167 and 169 are performed after step 165 has been performed. Step 167 comprises obtaining, e.g., creating, a displacement map which includes the first frequency components selected in step 163. The first frequency components are only represented in the displacement map. Step 169 comprises obtaining, e.g., creating, a bump map which includes the second frequency components selected in step 165. By including these second frequency components in the bump map, the print tracks created by the additive manufacturing process are represented in the bump map.

Figure 6:
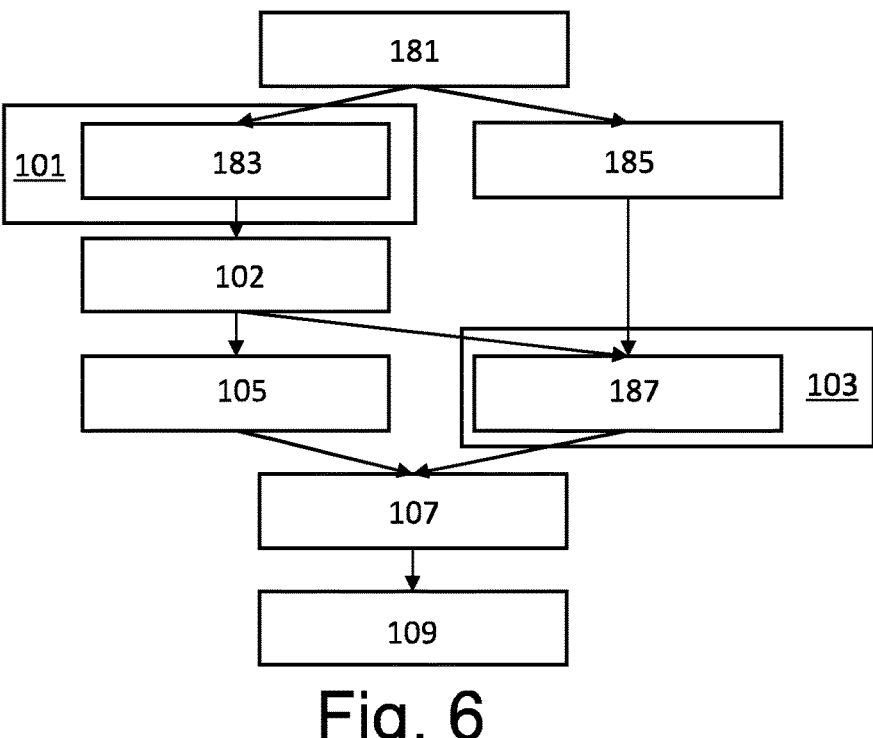
FIG. 6 is a flow diagram of a fifth embodiment of the method.

A fifth embodiment of the method of displaying a visual representation of a luminaire to be manufactured using an additive manufacturing process is shown in FIG. 6. The embodiment of FIG. 6 is an extension of the embodiment of FIG. 2. In the embodiment of FIG. 6, the three-dimensional model is determined based on a digital three-dimensional design model and a displacement map is also determined based on this digital three-dimensional design model.

In the embodiment of FIG. 6, a step 181 is performed before step 101 and step 101 is implemented by a step 183. Step 181 comprises receiving a digital three-dimensional design model of the luminaire, e.g., a fully detailed 3D model of the product. The digital three-dimensional design model comprises texture details of the luminaire. Step 183 comprises creating the three-dimensional (base) model based on the digital three-dimensional design model received in step 181. A step 185 is also performed after step 181. Step 185 comprises creating a displacement map based on the (texture details in the) digital three-dimensional design model received in step 181. This displacement map thus represents texture details associated with the luminaire.

Step 105 is performed after step 102 has been performed. Step 105 comprises creating a bump map based on the print track data determined in step 102 to represent the print tracks created by the additive manufacturing process. In the embodiment of FIG. 6, step 103 of FIG. 2 is implemented by a step 187. Step 187 is performed after step 102 and step 185 have been performed. In step 187, the displacement map created in step 185 is extended based on the print track data determined in step 102, e.g., to represent modulation patterns.

Figure 7:
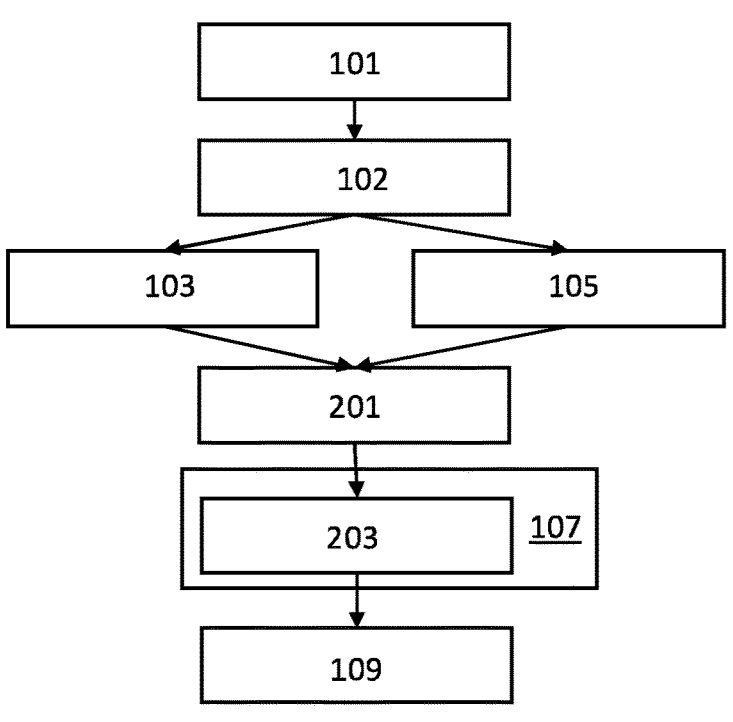
FIG. 7 is a flow diagram of a sixth embodiment of the method.

A sixth embodiment of the method of displaying a visual representation of a luminaire to be manufactured using an additive manufacturing process is shown in FIG. 7. The embodiment of FIG. 7 is an extension of the embodiment of FIG. 2. In the embodiment of FIG. 7, instead of step 107, a step 201 is performed after steps 103 and 105 have been performed. Step 107 is performed after step 201. In the embodiment of FIG. 7, step 107 is implemented by a step 203.

Step 201 comprises determining user-specified parameters for the additive manufacturing process. Step 203 comprises rendering the visual representation of the luminaire further based on the user-specified parameters. For example, user-specified parameters may indicate the print layer height and/or width and/or from which material the luminaire will be manufactured.

The embodiments of FIGS. 2 to 7 differ from each other in multiple aspects, i.e., multiple steps have been added or replaced. In variations on these embodiments, only a subset of these steps is added or replaced and/or one or more steps is omitted. As a first example, steps 121 and 123 of FIG. 4 may be added to the embodiments of FIGS. 5 to 7. As a second example, steps 201 and 203 of FIG. 7 may be added to the embodiments of FIGS. 4 to 6.

Figure 8:
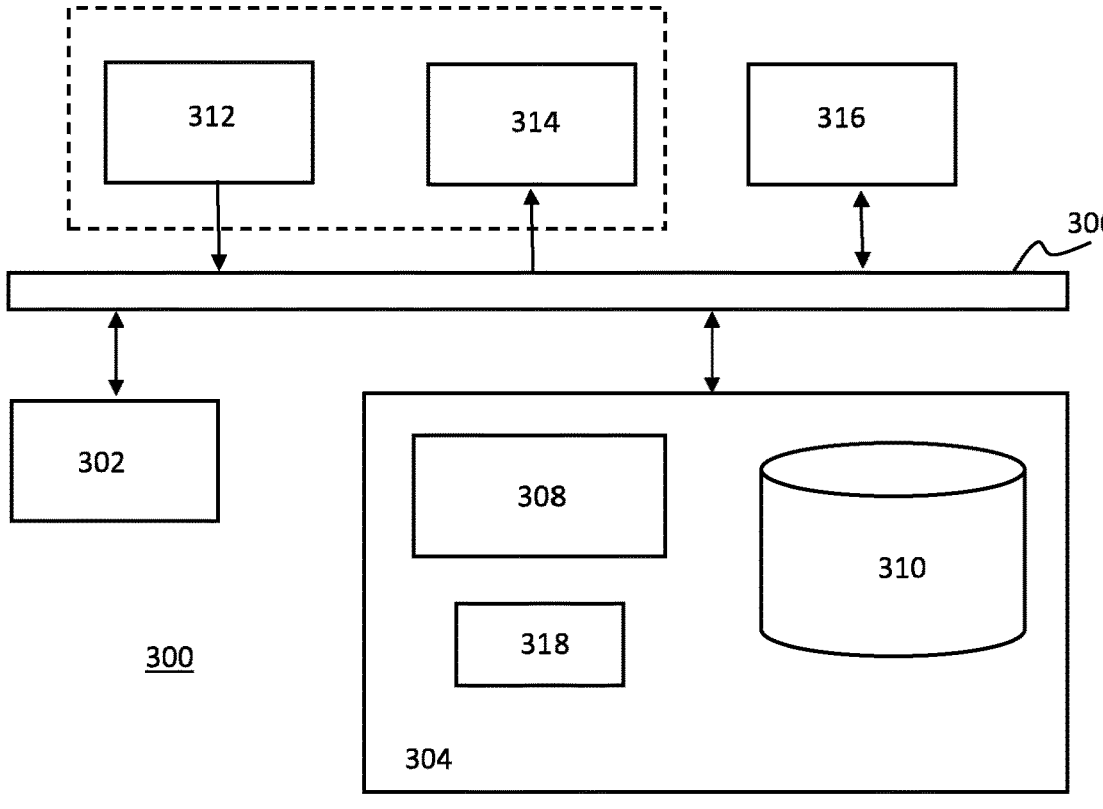
FIG. 8 is a block diagram of an exemplary data processing system for performing the method of the invention.

FIG. 8 depicts a block diagram illustrating an exemplary data processing system that may perform the method as described with reference to FIGS. 2 to 7.

As shown in FIG. 8, the data processing system 300 may include at least one processor 302 coupled to memory elements 304 through a system bus 306. As such, the data processing system may store program code within memory elements 304. Further, the processor 302 may execute the program code accessed from the memory elements 304 via a system bus 306. In one aspect, the data processing system may be implemented as a computer that is suitable for storing and/or executing program code. It should be appreciated, however, that the data processing system 300 may be implemented in the form of any system including a processor and a memory that is capable of performing the functions described within this specification.

The memory elements 304 may include one or more physical memory devices such as, for example, local memory 308 and one or more bulk storage devices 310. The local memory may refer to random access memory or other non-persistent memory device(s) generally used during actual execution of the program code. A bulk storage device may be implemented as a hard drive or other persistent data storage device. The processing system 300 may also include one or more cache memories (not shown) that provide temporary storage of at least some program code in order to reduce the quantity of times program code must be retrieved from the bulk storage device 310 during execution. The processing system 300 may also be able to use memory elements of another processing system, e.g. if the processing system 300 is part of a cloud-computing platform.

Input/output (I/O) devices depicted as an input device 312 and an output device 314 optionally can be coupled to the data processing system. Examples of input devices may include, but are not limited to, a keyboard, a pointing device such as a mouse, a microphone (e.g. for voice and/or speech recognition), or the like. Examples of output devices may include, but are not limited to, a monitor or a display, speakers, or the like. Input and/or output devices may be coupled to the data processing system either directly or through intervening I/O controllers.

In an embodiment, the input and the output devices may be implemented as a combined input/output device (illustrated in FIG. 8 with a dashed line surrounding the input device 312 and the output device 314). An example of such a combined device is a touch sensitive display, also sometimes referred to as a "touch screen display" or simply "touch screen". In such an embodiment, input to the device may be provided by a movement of a physical object, such as e.g. a stylus or a finger of a user, on or near the touch screen display.

A network adapter 316 may also be coupled to the data processing system to enable it to become coupled to other systems, computer systems, remote network devices, and/or remote storage devices through intervening private or public networks. The network adapter may comprise a data receiver for receiving data that is transmitted by said systems, devices and/or networks to the data processing system 300, and a data transmitter for transmitting data from the data processing system 300 to said systems, devices and/or networks. Modems, cable modems, and Ethernet cards are examples of different types of network adapter that may be used with the data processing system 300.

As pictured in FIG. 8, the memory elements 304 may store an application 318. In various embodiments, the application 318 may be stored in the local memory 308, the one or more bulk storage devices 310, or separate from the local memory and the bulk storage devices. It should be appreciated that the data processing system 300 may further execute an operating system (not shown in FIG. 8) that can facilitate execution of the application 318. The application 318, being implemented in the form of executable program code, can be executed by the data processing system 300, e.g., by the processor 302. Responsive to executing the application, the data processing system 300 may be configured to perform one or more operations or method steps described herein.

FIG. 8 shows the input device 312 and the output device 314 as being separate from the network adapter 316. However, additionally or alternatively, input may be received via the network adapter 316 and output be transmitted via the network adapter 316. For example, the data processing system 300 may be a cloud server. In this case, the input may be received from and the output may be transmitted to a user device that acts as a terminal.

Various embodiments of the invention may be implemented as a program product for use with a computer system, where the program(s) of the program product define functions of the embodiments (including the methods described herein). In one embodiment, the program(s) can be contained on a variety of non-transitory computer-readable storage media, where, as used herein, the expression "non-transitory computer readable storage media" comprises all computer-readable media, with the sole exception being a transitory, propagating signal. In another embodiment, the program(s) can be contained on a variety of transitory computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., flash memory, floppy disks within a diskette drive or hard-disk drive or any type of solid-state random-access semiconductor memory) on which alterable information is stored. The computer program may be run on the processor 302 described herein.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration, but is not intended to be exhaustive or limited to the implementations in the form disclosed. Many modifications and variations will be apparent to those of ordinary skill in the art without departing from the scope of the present invention. The embodiments were chosen and described in order to best explain the principles and some practical applications of the present invention, and to enable others of ordinary skill in the art to understand the present invention for various embodiments with various modifications as are suited to the particular use contemplated.

The invention claimed is:

1. A system for displaying a visual representation of a luminaire to be manufactured using an additive manufacturing process, said system comprising:
    at least one output interface; and
    at least one processor configured to:
        obtain a three-dimensional model of said luminaire,
        perform frequency splitting on texture details associated with said luminaire,
        select a first portion of said texture details and a second portion of said texture details based on said frequency splitting,
        obtain a displacement map which includes she said first portion, said first portion being included only in said displacement map,
        obtain a bump map which includes said second portion, said second portion being included only in said bump map,
        render said visual representation of said luminaire based on said three-dimensional model, said displacement map, and said bump map, and
        display said visual representation via said at least one output interface.

2. A system as claimed in claim 1, wherein said at least one processor is configured to determine at least one layer height and at least one track width and represent print tracks created by said additive manufacturing process in said bump map based on said at least one layer height and said at least one track width.

3. A system as claimed in claim 1, wherein said at least one processor is configured to:
    determine a camera location and orientation based on user input, and
    render said visual representation of said luminaire further based on said camera location and orientation.

4. A system as claimed in claim 3, wherein said at least one processor is configured to:
    determine a further camera location and orientation based on further user input, render a further visual representation of said luminaire based on said three-dimensional model, said displacement map, said bump map, and said further camera location and orientation, and
    display said further visual representation via said at least one output interface.

5. A system as claimed in claim 1, wherein said at least one processor is configured to select said first portion by selecting frequency components having a frequency not exceeding a threshold and select said second portion by selecting frequency components having a frequency exceeding said threshold.

6. A system as claimed as claim 5, wherein said at least one processor is configured to determine said threshold based on one or more parameters of said additive manufacturing process.

7. A system as claimed in claim 1, wherein said at least one processor is configured to select said first portion of texture details associated with said luminaire and said second portion of said texture details based on an orientation of print tracks created by said additive manufacturing process in said bump map and orientations of said texture details.

8. A system as claimed in claim 1, wherein said visual representation includes a representation of a light effect generated by an activated light source in said luminaire.

9. A system as claimed in claim 1, wherein said at least one processor is configured to:
    receive a digital three-dimensional design model of said luminaire, said digital three-dimensional design model comprising texture details of said luminaire, and
    obtain said three-dimensional model and said displacement map by creating said three-dimensional model and said displacement map based on said digital three-dimensional design model, said displacement map being created based on said texture details of said luminaire.

10. A system as claimed in claim 1, wherein said at least one processor is configured to:
    determine user-specified parameters for said additive manufacturing process, and
    render said visual representation of said luminaire further based on said user-specified parameters.

11. A method of displaying a visual representation of a luminaire to be manufactured using an additive manufacturing process, said method comprising:
    obtaining a three-dimensional model of said luminaire;
    performing frequency splitting on texture details associated with said luminaire;
    selecting a first portion of said texture details and selecting a second portion of said texture details based on said frequency splitting;
    obtaining a displacement map which includes said first portion, said first portion being included only in said displacement map;
    obtaining a bump map which includes said second portion, said second portion being included only in said bump map;
    rendering said visual representation of said luminaire based on said three-dimensional model, said displacement map, and said bump map; and
    displaying said visual representation.

12. A non-transitory computer readable medium comprising computer program code to perform the method of claim 11 when executed on a processor.

* * * * *